(12) United States Patent
Nagai et al.

(10) Patent No.: US 10,830,113 B2
(45) Date of Patent: Nov. 10, 2020

(54) FILTER

(71) Applicant: NGK INSULATORS, LTD., Nagoya (JP)

(72) Inventors: Shungo Nagai, Nagoya (JP); Takayoshi Shibayama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 153 days.

(21) Appl. No.: 16/178,981

(22) Filed: Nov. 2, 2018

(65) Prior Publication Data

US 2019/0178126 A1    Jun. 13, 2019

(30) Foreign Application Priority Data

Dec. 8, 2017  (JP) ................................. 2017-236141

(51) Int. Cl.
*B01D 46/24*    (2006.01)
*F01N 3/02*    (2006.01)
*F01N 3/022*   (2006.01)

(52) U.S. Cl.
CPC ....... *F01N 3/0222* (2013.01); *B01D 46/2418* (2013.01); *B01D 46/2429* (2013.01); *B01D 46/2451* (2013.01); *B01D 46/2455* (2013.01); *B01D 46/2474* (2013.01); *B01D 2046/2437* (2013.01); *F01N 2330/06* (2013.01); *F01N 2330/30* (2013.01)

(58) Field of Classification Search
CPC .............. F01N 3/0222; B01D 46/2429; B01D 46/2451; B01D 46/2418
USPC ............................................. 55/523, DIG. 30
See application file for complete search history.

(56) References Cited

U.S. PATENT DOCUMENTS 7,833,606 B2 *  11/2010  Suwabe ................ F01N 3/0222
                                                              264/630
8,512,433 B2 *   8/2013  Beall ................... F01N 13/0093
                                                              422/169

(Continued)

FOREIGN PATENT DOCUMENTS

JP    2003-001029 A1    1/2003
JP    2003-214140 A1    7/2003

(Continued)

OTHER PUBLICATIONS

Japanese Office Action (Application No. 2017-236141) dated Aug. 18, 2020 (with English translation).

*Primary Examiner* — Robert A Hopkins
(74) *Attorney, Agent, or Firm* — Burr & Brown, PLLC

(57) ABSTRACT

A filter comprising a columnar honeycomb structure part, the columnar honeycomb structure part including: a plurality of first cells each extending from a first bottom surface to a second bottom surface of the columnar honeycomb structure part, the first bottom surface being opened and the second bottom surface being plugged for the plurality of first cells; a plurality of second cells each extending from the first bottom surface to the second bottom surface of the columnar honeycomb structure part, the first bottom surface being plugged and the second bottom surface being opened for the plurality of second cells; and porous cordierite partition walls that define the first cells and the second cells, the partition walls having an average pore depth of 1.5 μm or more and 3.5 μm or less as measured by a laser microscope, and a porosity of from 50 to 60% as measured by a mercury porosimeter.

8 Claims, 3 Drawing Sheets

(56) References Cited

U.S. PATENT DOCUMENTS

2004/0191133 A1 9/2004 Yamaguchi
2012/0009093 A1 1/2012 Mizutani et al.
2017/0274354 A1 9/2017 Yamamoto et al.

FOREIGN PATENT DOCUMENTS

JP      2004-300951 A1    10/2004
JP      2017-170396 A1     9/2017
WO      2010/110011 A1     9/2010

* cited by examiner

[FIG. 1]
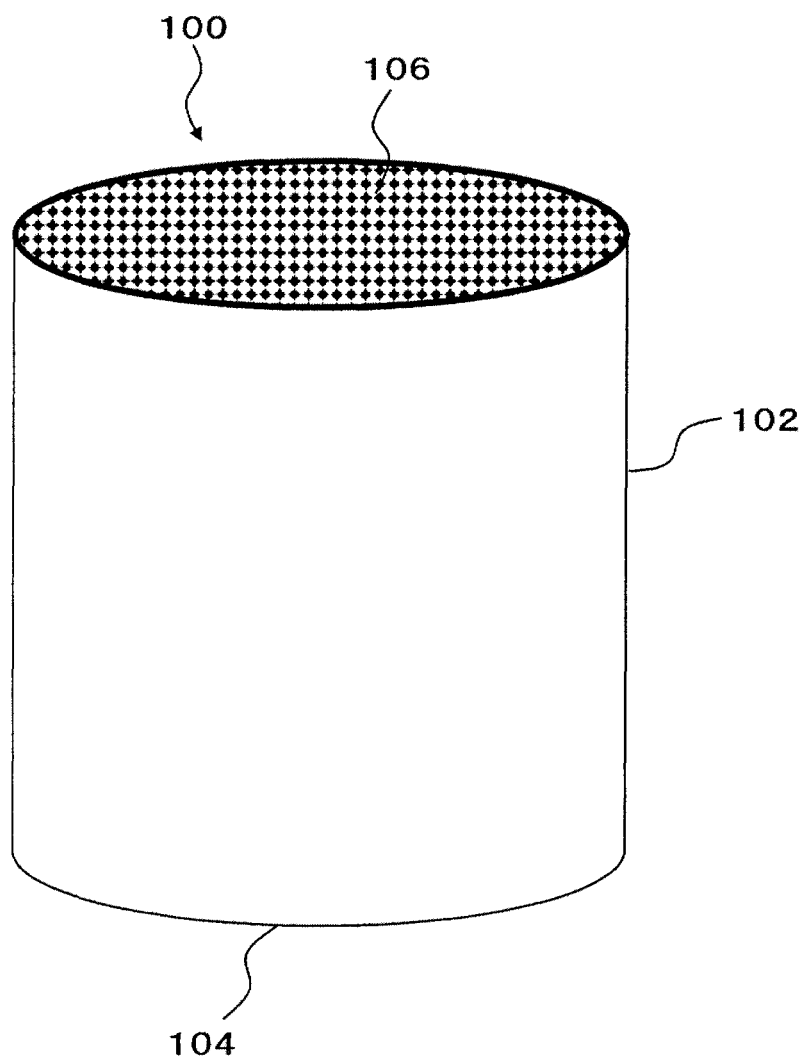

[FIG. 2]
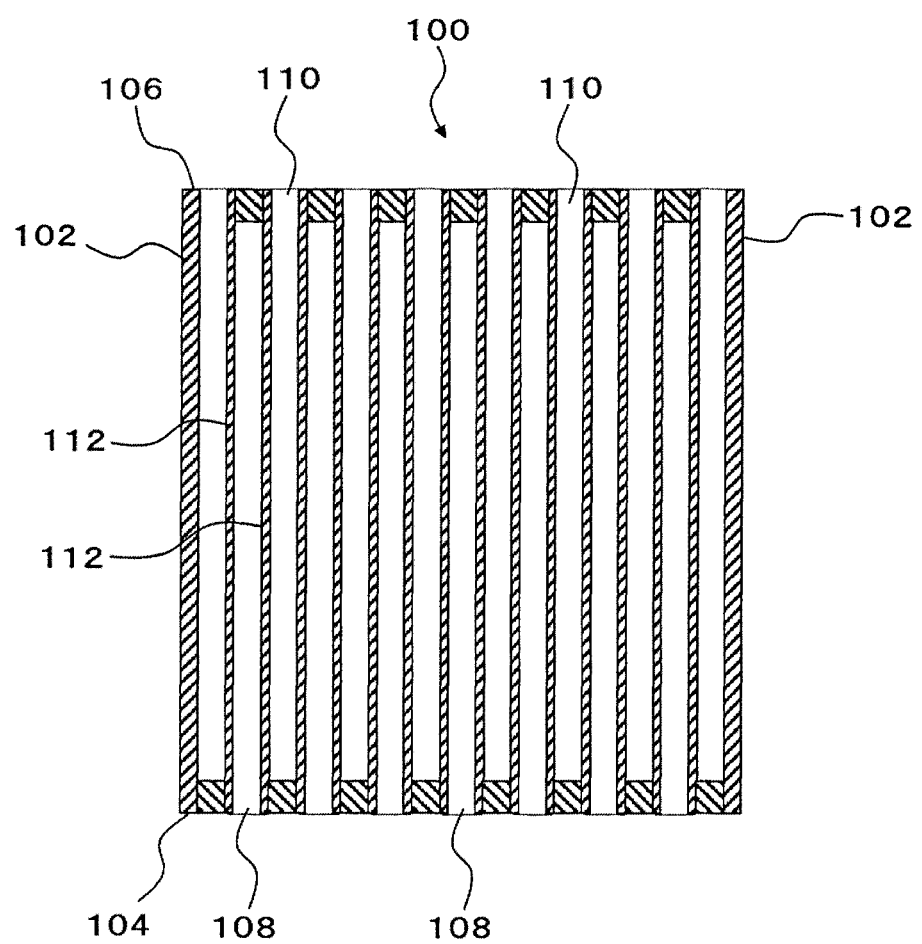

[FIG. 3]
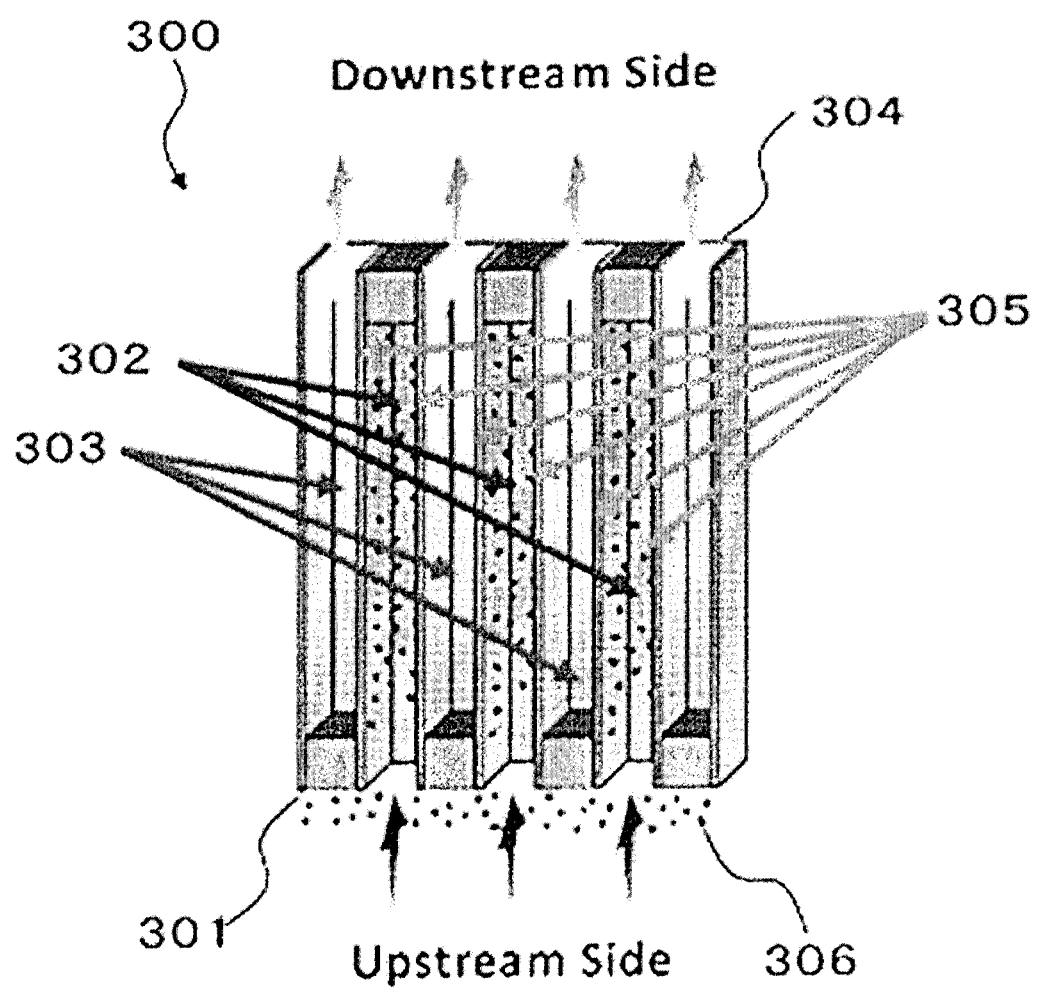

FILTER

TECHNICAL FIELD

The present invention relates to a filter. More particularly, the present invention relates to an exhaust gas purifying filter which is installed in an exhaust gas line of a combustion engine or combustion apparatus and used for removing particulate matter (PM) in exhaust gas.

BACKGROUND ART

Conventionally, a filter is known to remove carbon-based particulate matter from a combustion exhaust gas discharged from, for example, a gasoline engine and a diesel engine. The filter includes a columnar honeycomb structure part having: a plurality of first cells each extending from a first bottom surface to a second bottom surface of the columnar honeycomb structure part, the first bottom surface being opened and the second bottom surface being plugged for the plurality of first cells; a plurality of second cells each extending from the first bottom surface to the second bottom surface of the columnar honeycomb structure part, the first bottom surface being plugged and the second bottom surface being opened for the plurality of second cells; and porous partition walls for defining the first and second cells.

In this type of exhaust gas purifying filter, the particulate matter is collected by the following mechanism (see FIG. 3). As an exhaust gas containing particulate matter 306 is supplied to the first bottom surface 301 on an upstream side of a filter provided with a columnar honeycomb structure part 300, the exhaust gas is introduced into the first cells 302 and travels through the first cells 302 toward the downstream. The exhaust gas passes through porous partition walls 305 that define the first cells 302 and second cells 303 and flows into the second cells 303, because the second bottom surface 304 on the downstream side is plugged for the first cells 302. The particulate matter 306 cannot pass through the partition walls 305, so that it is trapped in the first cells 302. A clean exhaust gas flowing into the second cells 303 travels through the second cells 303 toward the downstream and is discharged from the second bottom surface 304 on the downstream side.

In general, a filter collection efficiency is in inverse proportion to a pressure loss. If the collection efficiency is to be increased, the pressure loss will be increased. On the other hand, if the pressure loss is to be decreased, the collection efficiency will be deteriorated. Therefore, to obtain a high collection efficiency with a low pressure loss, various researches and developments of the partition wall structure of the filter have been conventionally made.

To obtain a honeycomb filter that has a high porosity of cell walls to keep a low pressure loss and a high collection efficiency of fine particles in exhaust gas, Patent Document 1 (Japanese Patent Application Publication No. 2003-1029 A) proposes that the honeycomb filter has a porosity of cell walls of from 55 to 75%, and preferably 60 to 70%, an average pore diameter of from 10 to 40 µm, and a surface roughness (maximum height Ry) of 10 µm or more.

Patent Document 2 (Japanese Patent Application Publication No. 2003-214140 A) discloses a diesel exhaust gas filter having a lower flow resistance of exhaust gas through partition walls in an outer peripheral portion than the flow resistance of the exhaust gas through partition walls in an inner peripheral portion, for the purpose of suppressing a pressure loss. Patent Document 2 also discloses that the porosity of the partition walls in the outer peripheral portion is preferably from 60% to 80%, the porosity of the partition walls in the inner peripheral portion is preferably from 50% to 60%, and the porosity of the partition walls in the outer peripheral portion is more preferably 70%, and the porosity of the partition walls in the inner peripheral portion is more preferably 55% (paragraph 0018). Patent Document 2 also discloses that the average pore diameter of the partition walls in the outer peripheral portion is preferably from 20 µm to 40 µm, the average pore diameter of the partition walls in the inner peripheral portion is preferably from 10 µm to 30 µm, and the average pore diameter of the partition walls in the outer peripheral portion is more preferably 30 µm, and the average pore diameter of the partition walls in the inner peripheral portion is more preferably 20 µm (paragraph 0020).

Patent Document 3 (Japanese Patent Application Publication No. 2004-300951 A) discloses that at least one fine coating layer formed of a porous ceramic having an average pore diameter smaller than that of a porous ceramic constituting a partition wall is formed on a surface of a partition wall on a purified gas outflow cell side, whereby particulates contained in an exhaust gas can be securely trapped. Patent Document 3 discloses that the thickness of the partition wall is preferably in a range of from 20 to 2000 µm (paragraph 0043), the average pore diameter of the porous ceramic constituting the partition wall is preferably from 15 to 300 µm, and more preferably from 20 to 70 µm (paragraph 0056), and the average pore diameter of the porous ceramic constituting the fine coat layer is preferably from 5 to 50 µm, and more preferably from 15 to 40 µm (paragraph 0056). Patent Document 3 also discloses that the porosity of the porous ceramic constituting the partition wall is preferably from 40 to 75%, and more preferably from 60 to 70% (paragraph 0057), and the porosity of the porous ceramic configuring the fine coating layer is preferably from 45 to 80% (paragraph 0057).

Patent Document 4 (WO 2010/110011 A1) discloses that when a porosity of a partition wall of lower than 35% significantly decreases a gas permeability of the partition wall, and a porosity of higher than 75% decreases a material strength, so that cracks may occur during canning. Therefore, it discloses that the basal body of the honeycomb structure includes the partition walls with a porosity of from 35 to 75% (paragraph 0080). Patent Document 4 also discloses that an average pore diameter of less than 5 µm is liable to remarkably decrease the gas permeability and leads to very high pressure loss in the absence of soot deposition, and that an average pore diameter of larger than 40 µm does not provide sufficient collection efficiency of PM in the honeycomb filter. Therefore, it discloses that the partition walls of the honeycomb structure basal body have an average pore diameter of from 5 to 40 µm, and preferably 10 to 20 µm (paragraph 0087).

CITATION LIST

Patent Literatures

Patent Document 1: Japanese Patent Application Publication No. 2003-1029 A

Patent Document 2: Japanese Patent Application Publication No. 2003-214140 A

Patent Document 3: Japanese Patent Application Publication No. 2004-300951 A

Patent Document 4: WO 2010/110011 A1

SUMMARY OF INVENTION

Technical Problem

Thus, optimization of various parameters such as the porosity and the average pore diameter has been studied in order to obtain a filter that achieves both a low pressure loss and a high collection efficiency, but there has been still room for improvement. The present invention has been made in view of the above circumstances. An object of the present invention is to provide a novel approach for improving the collection efficiency of particulate matter while keeping a low pressure loss, for a filter including a columnar honeycomb structure part.

Solution to Problem

Conventionally, attention has often been paid to the porosity and the average pore diameter in order to improve the filter performance, but the present inventors have newly found that a pore depth of the partition wall has a significant effect on the collection efficiency of the particulate matter. Then, the present inventors have found that the setting of the pore depth of the partition wall to a predetermined range is an important parameter for increasing the collection efficiency of particulate matter while maintaining the low pressure loss. The present invention has been completed based on the above findings.

Thus, in one aspect, the present invention relates to:
a filter comprising a columnar honeycomb structure part, the columnar honeycomb structure part comprising:
 a plurality of first cells each extending from a first bottom surface to a second bottom surface of the columnar honeycomb structure part, the first bottom surface being opened and the second bottom surface being plugged for the plurality of first cells;
 a plurality of second cells each extending from the first bottom surface to the second bottom surface of the columnar honeycomb structure part, the first bottom surface being plugged and the second bottom surface being opened for the plurality of second cells; and
 porous cordierite partition walls that define the first cells and the second cells, the partition walls having an average pore depth of 1.5 μm or more and 3.5 μm or less as measured by a laser microscope, and a porosity of from 50 to 60% as measured by a mercury porosimeter.

In one embodiment of the filter according to the present invention, the partition walls have the average pore depth of 2.5 μm or more and 3.5 μm or less as measured by the laser microscope.

In another embodiment of the filter according to the present invention, the partition walls have a maximum pore depth of 40 μm or less as measured by a laser microscope.

In yet another embodiment of the filter according to the present invention, the partition walls have a maximum pore depth of 20 μm or more and 26 μm or less as measured by a laser microscope.

In yet another embodiment of the filter according to the present invention, the partition walls have an average equivalent circle pore diameter of 10.5 μm or less as measured by a laser microscope.

In yet another embodiment of the filter according to the present invention, the partition walls have an average equivalent circle pore diameter of 5 μm or more and 10 μm or less as measured by a laser microscope.

In yet another embodiment of the filter according to the present invention, the partition walls have an average pore diameter of 5 μm or more and 13 μm or less as measured by a mercury porosimeter.

In yet another embodiment of the filter according to the present invention, the partition walls have a thickness of 150 μm or more and 260 μm or less.

Advantageous Effects of Invention

According to the filter of the present invention, it is possible to improve the collection efficiency of particulate matter while keeping the pressure loss low. Therefore, the filter according to the present invention is very useful for removing the particulate matter in the exhaust gas when installed in an exhaust gas line of a combustion engine or a combustion apparatus. Recently, automobile exhaust gas regulations have tended to be strengthened and an emission amount of particulate matter in exhaust gas has tended to be strict. The filter according to the present invention can be expected to be used as a filter fulfilling such strict exhaust gas regulations. Therefore, the filter according to the present invention can be suitably used as a diesel particulate filter (DPF) for collecting particulate matter discharged from a diesel engine, for example.

BRIEF DESCRIPTION OF DRAWINGS

FIG. 1 is a schematic perspective view of a filter according to an embodiment of the present invention.

FIG. 2 is a schematic cross-sectional view when a honeycomb structure part of a filter according to an embodiment of the present invention is observed from a direction orthogonal to a cell extending direction.

FIG. 3 is a schematic view for explaining a collection mechanism of particulate matter by a filter.

DESCRIPTION OF THE PREFERRED EMBODIMENTS

Hereinafter, embodiments of the present invention will be specifically described with reference to the drawings. It should be understood that the present invention is not limited to the following embodiments, and embodiments where various modifications, improvements, and the like are added to the following embodiments as needed based on the ordinary knowledge of one of skill in the art without departing from the spirit of the present invention would fall within the scope of the present invention.

FIG. 1 is a schematic perspective view of a filter according to an embodiment of the present invention. FIG. 2 shows a schematic cross-sectional view when a honeycomb structure part of a filter according to an embodiment of the present invention is observed from a direction orthogonal to a cell extending direction. A filter 100 as illustrated includes: an outer peripheral side wall 102; a plurality of first cells 108 disposed on an inner side of the outer peripheral side wall 102, extending from a first bottom surface 104 to a second bottom surface 106 of the honeycomb structure part, the first bottom surface 104 being opened and the second bottom surface 106 being plugged for the plurality of first cells 108; and a plurality of second cells 110 disposed on the inner side of the outer peripheral side wall 102, extending from the first bottom surface 104 to the second bottom surface 106 of the honeycomb structure part, the first bottom surface 104 being plugged and the second bottom surface 106 being opened for the plurality of second cells 110. The illustrated filter 100 also includes porous partition walls 112 that define the first cells 108 and the second cells 110. The first cells 108 and the second cells 110 are alternately disposed so as to be adjacent to each other with the partition walls 112 interposed therebetween.

<1. Material of Partition Wall>

Suitable numerical ranges of various parameters relating to the partition walls may vary depending on materials. Conventionally, in many cases, various parameters relating to the partition walls were comprehensively defined in spite of different materials, and the defined numerical range was wide, so that optimization of various parameters when using a specific material was insufficient. In the present invention, a subject of study has been limited to a cordierite partition wall so that the present inventors could arrive at focusing on the importance of a pore depth which has not been studied yet and could reconsider the optimum ranges of conventionally used parameters. As a result, the present inventors could acquire findings leading to further improvement of filter performance.

The cordierite partition walls mean partition walls having a total mass ratio of cordierite ($2MgO.2Al_2O_3.5SiO_2$) of 50% by mass or more per 100% by mass of materials forming the partition walls. The mass ratio of cordierite per 100% by mass of materials forming the partition walls is preferably 70% by mass or more, and more preferably 90% by mass or more, and still more preferably 99% by mass or more. The mass ratio of cordierite may be 100% by mass of the materials forming the partition walls, with the exception of inevitable impurities.

Examples of materials other than cordierite forming the partition walls include ceramic materials such as mullite, zircon, aluminum titanate, silicon carbide, zirconia, spinel, indialite, sapphirine, corundum, titania and the like. One of these ceramic materials may be used alone, or two or more of them may be contained at the same time.

Materials of constituent parts (for example, plugged portions and an outer peripheral wall) other than the partition walls forming the filter preferably include, but not limited to, ceramic materials, in terms of strength and heat resistance. The ceramic materials preferably contain at least one selected from the group consisting of cordierite, silicon carbide, silicon nitride, mullite, alumina and silica. The materials of the constituent parts may preferably contain a total 50% by mass or more, and more preferably a total 80% by mass or more of these ceramic materials. The constituent parts other than the partition wall forming the filter are preferably made of cordierite, and further more preferably, they have the same material composition as the partition walls so that the coefficient of expansion during firing can be identical, leading to improved durability.

<2. Average Pore Depth>

A pore depth of the partition walls is an important parameter for improving the collection efficiency of particulate matter by the filter. Among parameters representing the pore depth of the partition walls, an average pore depth is closely related to the collection efficiency. Therefore, it is important to set the average pore depth to an appropriate range. Specifically, the average pore depth of the partition walls is preferably 3.5 µm or less, and more preferably 3.2 µm or less, and still more preferably 3.0 µm or less. The average pore depth of the partition walls within the above range will result in significant improvement of the collection efficiency of the particulate matter.

The average pore depth of the partition walls is preferably 1.5 µm or more, and more preferably 2.0 µm or more, and still more preferably 2.5 µm or more. The average pore depth of the partition walls within the above range can suppress an increase in pressure loss due to accumulation of particulate matter or ash.

<3. Maximum Pore Depth>

A maximum pore depth of the partition walls is also related to the collection efficiency of the particulate matter, and it is thus desirable to set the maximum pore depth to an appropriate range. Specifically, the maximum pore depth of the partition walls is preferably 40 µm or less, and more preferably 35 µm or less, and even more preferably 30 µm or less, and most preferably 26 µm or less. The maximum pore depth of the partition walls within the above range will result in significant improvement of the collection efficiency of the particulate matter.

The maximum pore depth of the partition walls is preferably 13 µm or more, and more preferably 15 µm or more, and still more preferably 17 µm or more, and even more preferably 20 µm or more. The maximum pore depth of the partition walls within the above range can suppress an increase in pressure loss due to accumulation of particulate matter or ash.

<4. Average Equivalent Circle Pore Diameter>

An average equivalent circle pore diameter of the partition walls is also related to the collection efficiency of the particulate matter, and it is thus desirable to set the average equivalent circle pore diameter to an appropriate range. Specifically, the average equivalent circle pore size of the partition walls is preferably 10.5 µm or less, and more preferably 10 µm or less, and even more preferably 9 µm or less, and most preferably 8 µm or less. The average equivalent circle pore diameter of the partition walls within the above range will result in significant improvement of the collection efficiency of the particulate matter.

The average equivalent circle pore diameter of the partition walls is preferably 5 µm or more, and more preferably 6 µm or more, and still more preferably 7 µm or more. The average equivalent circle pore diameter of the partition walls within the above range can suppress an increase in pressure loss due to accumulation of particulate matter or ash.

In the present invention, the average pore depth, the maximum pore depth and the average equivalent circle pore diameter of the partition wall as stated above are determined by observing the surfaces of the partition walls from a direction perpendicular to the surfaces of the partition walls using a laser microscope, under the following conditions. A shape analysis laser microscope VK-X260 (available from KEYENCE CORPORATION) is used, and a "multi-file analysis application VK-H1XM" attached to the laser microscope is used as an analysis software. A laser microscope having the same performance as the above laser microscope may also be used. Also, a height threshold is set to −5.000 µm, and any micro area (3 pixels or less) is ignored. With an observation area per a field of view of about 2 $mm^2$, each of the average pore depth, the maximum pore depth and the average equivalent circle pore diameter is measured at every field of view, and an average value when observing three or more fields of view is determined to be each measured value.

<5. Porosity>

A porosity of the partition walls is particularly related to the pressure loss of the filter, and it is thus desirable to set the porosity to an appropriate range. Specifically, the porosity of the partition walls is preferably 50% or more, and more preferably 52% or more, and still more preferably 54% or more. The porosity of the partition walls within the above range can suppress the pressure loss of the filter.

Further, the porosity of the partition wall is preferably 60% or less, and more preferably 58% or less, and still more preferably 56% or less. The porosity of the partition wall within the above range will result in improvement of strength, which can suppress breakage during canning.

<6. Average Pore Diameter of Partition Wall>

An average pore diameter of the partition walls is also related to the collection efficiency of the particulate matter, and it is thus desirable to set the average pore diameter to an appropriate range. Specifically, the average pore diameter of the partition walls is preferably 13 μm or less, and more preferably 12 μm or less, and still more preferably 10 μm or less. The average pore diameter of the partition wall within the above range will result in significant improvement of the collection efficiency of the particulate matter.

The average pore diameter of the partition walls is preferably 5 μm or more, and more preferably 6 μm or more, and still more preferably 7 μm or more. The average pore diameter of the partition wall within the above range can suppress a decrease in the pressure loss.

In the present invention, the porosity and average pore diameter of the partition walls as stated above are measured with a mercury porosimetry in accordance with JIS R1655:2003 using a mercury porosimeter. In Examples, a model Autopore 9505 available from Micrometrics Company was used. The mercury porosimetry is carried out by applying equilibrium pressure while immersing a sample in mercury under vacuum, and injecting mercury into the sample while gradually increasing the pressure, and calculating a pore diameter distribution from the pressure and the volume of mercury intruding into the pores. As the pressure is gradually increased, mercury intrudes the pores in order of the diameter of the pores to increase a cumulative volume of mercury. As all the pores are finally filled with mercury, the cumulative volume reaches the equilibrium amount.

The cumulative volume at this time is a total pore volume (cm$^3$/g), and the pore diameter when mercury intrudes 50% of the total pore volume is determined to be the average pore diameter. Further, the porosity is calculated from an amount of mercury entering the pores, and it is defined as a porosity. Specifically, the porosity is calculated by the equation: porosity (%)=total pore volume/(total pore volume+1/2.52)×100. Note that 2.52 g/cm$^3$ is the true density of cordierite.

<7. Thickness of Partition Wall>

The partition walls preferably have a thickness of 150 μm or more, and more preferably 170 μm or more, and still more preferably 190 μm or more, in terms of improving the filter strength and collection efficiency. The thickness of the partition walls is preferably 260 μm or less, and more preferably 240 μm or less, and still more preferably 220 μm or less, in terms of suppressing the pressure loss of the filter.

It is also preferable to support a catalyst on the surface or the inside of the partition walls to help PM combustion. Examples of the catalyst include noble metals (Pt, Pd, Rh and the like), alkali metals (Li, Na, K, Cs and the like), alkaline earth metals (Ca, Ba, Sr and the like), rare earths (Ce, Sm, Gd, Nd, Y, Zr, Ca, La, Pr and the like), and transition metals (Mn, Fe, Co, Ni, Cu, Zn, Sc, Ti, V, Cr, and the like).

<8. Cell Shape>

The cross-sectional shape of each cell as observed from a direction parallel to the extending direction of the cell is not particularly limited, and it includes, for example, shapes such as a triangle, a quadrangle, a hexagon and a round shape. Cell density (the number of cells per unit cross-sectional area) is not particularly limited, and it may be, for example, from 6 to 2000 cells/square inch (from 0.9 to 311 cells/cm$^2$), and more preferably from 50 to 1000 cells/square inch (from 7.8 to 155 cells/cm$^2$), and even more preferably from 100 to 400 cells/square inch (from 15.5 to 62.0 cells/cm$^2$).

The shape of the bottom surface of the filter is also not particularly limited, and it may be a polygonal shape such as a circular shape, an elliptical shape, a race track shape, an oval shape, a triangular shape, a substantially triangular shape, a quadrangular shape, a substantially quadrangular shape, or an atypical shape. The bottom of filter 100 shown has a circular shape, and the entire of the filter 100 has a cylindrical shape.

<9. Producing Method>

Next, a method for producing the filter according to the present invention will be exemplarily described. First, a green body for forming the filter is formed. A cordierite-forming material is prepared as a material for the green body. For example, the cordierite-forming material can be obtained by mixing a plurality of raw material particles including an alumina source, a silica source and a magnesia source, such that a composition after firing becomes the theoretical composition of cordierite ($2MgO.2Al_2O_3.5SiO_2$).

The alumina source can include aluminum oxide (alumina), aluminum hydroxide, activated alumina, and boehmite ($Al_2O_3.H_2O$). Particles such as kaolin ($Al_2O_3.2SiO_2.2H_2O$) and mullite ($3Al_2O_3.2SiO_2$) can be used as substances that play a role of both the alumina source and the silica source.

The silica source that can be used include particles such as silica, composite oxides containing silica, or substances to be converted into silica by firing, and the like. Specific examples include particles such as talc ($3MgO.4SiO_2.H_2O$) that serves as a silica source, as well as silica ($SiO_2$) such as quartz, silica gel, fused silica, kaolin ($Al_2O_3.2SiO_2.2H_2O$), calcined kaolin, mullite ($3Al_2O_3.2SiO_2$) and the like. It should be noted that the calcined kaolin refers to one obtained by calcining kaolin (raw kaolin) produced as a mineral at a predetermined temperature, for example, a temperature of from 1000 to 1100° C. Among them, the silica gel is preferably used because it has an effect of suppressing the formation of large sized pores.

The magnesia source that can be used includes particles such as magnesia, complex oxides containing magnesia, substances to be converted into magnesia by firing, and the like. Besides the above talc ($3MgO.4SiO_2.H_2O$) serving as a magnesia source, particles such as magnesite ($MgCO_3$) can be mentioned.

A finer particle size of the cordierite-forming material tends to provide a lower average pore depth, a lower maximum pore depth and a smaller average pore diameter of the partition walls.

As used herein, the median diameter of the particles refer to a 50% particle diameter when a cumulative particle size distribution on a volume basis is measured by a laser diffraction/scattering type particle size measuring apparatus using a measurement principle of a light scattering method. It should be noted that the particle size measurement is carried out in a state where the raw materials are completely dispersed in a dispersion medium such as water.

To the cordierite-forming material obtained as described above are then added a dispersion medium, an organic binder, a pore former, a dispersant and the like, and they are mixed and kneaded to obtain a green body. The mixing and kneading may be carried out by known mixing and kneading methods.

The mixing is preferably carried out by stirring the materials while applying a shearing force, using a mixer having good stirring power/dispersing power, which can rotate a stirring blade at a high speed of 500 rpm or more (preferably 1000 rpm or more). Such a mixing method can allow agglomerates of fine particles contained in the respective raw material particles, which will otherwise cause internal defects of the resulting honeycomb structure body, to be crushed and eliminated. The mixing can be carried out using a conventionally known mixer, for example, a sigma kneader, a ribbon mixer or the like.

The kneading can be carried out using a conventionally known kneading machine, for example, a sigma kneader, a Banbury mixer, a screw type extrusion kneader or the like. In particular, a kneading machine (so-called vacuum clay kneader, biaxial continuous kneading extruder or the like) equipped with a vacuum/pressure reducing apparatus (for example, a vacuum pump or the like) is preferably used, because it can provide a green body having less defects and good formability.

Examples of the dispersion medium can include water, or a mixed solvent of water and an organic solvent such as alcohol, and the like. In particular, water can be suitably used.

Examples of the organic binder that can be suitably used include hydroxypropylmethyl cellulose, methyl cellulose, hydroxyethyl cellulose, carboxymethyl cellulose, polyvinyl alcohol and the like.

Examples of the pore former include carbon such as graphite; organic pore formers such as wheat flour, starch, phenol resins, acrylic resins such as polymethyl methacrylate, polyethylene, or polyethylene terephthalate, and the like. Among these, polymers such as the acrylic resins can be particularly preferably used. A pore former having a finer particle size is advantageous for suppressing a decrease in porosity while decreasing the average pore depth, the maximum pore depth and the average pore diameter of the partition walls. Specifically, the median diameter of the pore former to be used is preferably 20 μm or less, and more preferably 15 μm or less.

The dispersant that can be suitably used includes substances having a surfactant effect, such as ethylene glycol, dextrin, fatty acid soaps, polyalcohol, potassium laurate soaps and the like.

The resulting green body can be formed by a molding method such as an extrusion molding method or the like to obtain a columnar honeycomb formed body in which a plurality of cells are defined by the partition walls. The extrusion molding is suitably carried out by using a die having a desired cell shape, partition wall thickness and cell density.

The resulting columnar honeycomb formed body is then dried, and plugged portions are formed on both bottom surfaces of the dried honeycomb formed body to obtain a honeycomb dried body. The method of drying is also not particularly limited. For example, conventionally known drying methods can be used, such as, for example, hot air drying, microwave drying, dielectric drying, reduced pressure drying, vacuum drying and freeze drying. Among them, a combination of the hot air drying and the microwave drying or dielectric drying is preferable, because it can allow rapid and uniform drying of the entire formed body.

A method of forming the plugged portions is now described. A plugging slurry is stored in a storage container. A mask having a plurality of openings at positions corresponding to the cells where the plugged portions are to be formed are then attached to one bottom surface. The bottom surface with the attached mask is immersed in the storage container, and the opening portions are filled with the plugging slurry to form plugged portions. For the other bottom surface, the plugged portions can be formed by the same method.

The plugged honeycomb dried body can be then fired to obtain a honeycomb structure body which can be used as an exhaust gas purifying filter. Firing conditions (temperature and time) may be set as needed according to types of the respective raw material particles for forming the honeycomb formed body, because the firing conditions may vary depending on the types of these particles. For example, the firing is preferably carried out at a temperature of from 1410 to 1440° C. for 3 to 10 hours. Firing conditions (temperature and time) of less than the above range tend to result in insufficient crystallization of cordierite. On the other hand, firing conditions of more than the above range tend to result in melting of the produced cordierite.

In addition, an operation (calcining) for burning and removing organic substances (the pore former, the organic binder, the dispersant, and the like) in the honeycomb dried body may be preferably performed before the firing or during a temperature rising process in the firing, because this operation can further promote the removal of the organic substances. The burning temperature of the organic binder is about 200° C., and the burning temperature of the pore former is from about 300 to 1000° C. Therefore, the calcining temperature may be set to about 200 to 1000° C. The calcining time is not particularly limited, but it is usually about 10 to 100 hours.

EXAMPLES

Hereinafter, Examples are illustrated for better understanding of the present invention and its advantages, but the present invention is not limited to the Examples.

Each of the component materials shown in Table 1 was prepared. The median diameter of each component material was measured with a laser diffraction/scattering type particle size measuring apparatus (model LA-950 V2, available from HORIBA). As the dispersion medium, an aqueous hexametaphosphoric acid solution having a concentration of 0.1% by mass was used. The results are shown in Table 1.

Talc A, talc B, aluminum oxide, aluminum hydroxide, kaolin, fused silica and silica gel shown in Table 1 were mixed at a predetermined mixing ratio (parts by mass) to prepare a cordierite-forming material according to each of Comparative Examples and Examples. To each cordierite-forming material obtained were added a binder, a pore former, a surfactant and water at the mixing ratio (parts by mass) shown in Table 1, and then charged into a mixer and mixed for 3 minutes to obtain a wet mixture.

TABLE 1

|  | Component | Median Diameter (μm) | Mixing Ratio (Parts by Mass) | | | |
|---|---|---|---|---|---|---|
|  |  |  | Comparative Example 1 | Comparative Example 2 | Example 1 | Example 2 |
| Cordierite-forming Material | Talc A (Particles) | 25 | 40 | — | — | — |
|  | Talc B (Particles) | 10 | — | — | 40 | 40 |
|  | Talc C (Particles) | 5 | — | 45 | — | — |
|  | Aluminum Oxide (Particles) | 7 | 15 | 15 | 15 | 15 |
|  | Aluminum Hydroxide (Particles) | 5 | 15 | 15 | 15 | 15 |
|  | Kaolin (Particles) | 6 | 15 | 10 | 15 | 15 |
|  | Fused Silica (Particles) | 20 | 15 | — | — | — |
|  | Crystalline Silica (Particles) | 5 | — | 15 | — | — |
|  | Silica Gel A (Particles) | 20 | — | — | 15 | — |
|  | Silica Gel B (Particles) | 10 | — | — | — | 15 |
| Binder | Methylcellulose (Particles) | Unmeasured Due to Water Solubility | 5 | 5 | 5 | 5 |
| Pore Former | Organic Pore Former A (Particles) | 35 | 5 | — | — | — |
|  | Organic Pore Former B (Particles) | 10 | — | 3.5 | 1.5 | 2.0 |
| Surfactant | Potassium Laurate Soap (Solution) | — | 1 | 1 | 1 | 1 |
| Dispersion Medium | Water | — | 45 | 65 | 60 | 68 |

The resulting wet mixture was charged into a screw-type extrusion kneader and kneaded to prepare a columnar green body. The kneaded green body was charged into an extruder and extruded to obtain a cylindrical honeycomb formed body. After the resulting honeycomb formed body was subjected to dielectric drying and hot air drying, both bottom surfaces of the formed body were cut so as to obtain a honeycomb dried body having predetermined dimensions. The resulting honeycomb dried body was subjected to plugging such that the first cells and the second cells are alternately arranged so as to be adjacent to each other, and the honeycomb dried body was then fired at a temperature of from 1420 to 1440° C. for 5 hours to obtain each of the honeycomb structure bodies according to Comparative Examples and Examples (each having a cylindrical shape with a diameter of 118 mm and a height of 152 mm).

Table 2 shows properties of partition walls of the honeycomb structures according to Comparative Examples and Examples. The average pore depth, the maximum pore depth and the average equivalent circle pore diameter were measured by a laser microscope according to the measurement methods as described earlier. Further, the porosity and the average pore diameter were measured using a mercury porosimeter according to the measurement methods as described earlier.

TABLE 2

|  | Unit | Comparative Example 1 | Comparative Example 2 | Example 1 | Example 2 |
|---|---|---|---|---|---|
| Partition Wall Thickness | μm (mil) | 203(8) | 203(8) | 203(8) | 203(8) |
| Cell Density | Cell/Square Inch | 300 | 300 | 300 | 300 |
| Cell Cross-sectional Shape |  | Square | Square | Square | Square |
| Average Pore Depth | μm | 4.0 | 1.3 | 2.9 | 3.3 |
| Maximum Pore Depth | μm | 58.1 | 10.0 | 23.2 | 13.3 |
| Average Equivalent Circle Pore Diameter | μm | 11.1 | 3.8 | 7.6 | 7.2 |

TABLE 2-continued

|  | Unit | Comparative Example 1 | Comparative Example 2 | Example 1 | Example 2 |
|---|---|---|---|---|---|
| Porosity | % | 55.3 | 54.6 | 56.6 | 58.1 |
| Average Pore Diameter | μm | 15.0 | 3.6 | 9.2 | 9.3 |

Each of the honeycomb structures according to Comparative Examples and Examples obtained by the above producing procedure were installed to an exhaust system for a vehicle equipped with a 1.4 L EURO 6 regulation compliant GDI engine, and used as an exhaust gas filter. For a preconditioning period, 3 cycles of EUDC (Extra Urban Driving Cycle) driving mode were conducted, followed by a driving mode (RTS 95) simulating the worst of RDE driving. During the driving mode simulating the worst of RDE driving, an amount of PN (Particulate Number) before and after the filter was measured with a particle counter available from TOKYO DYLEC CORP., and a filter collection efficiency was calculated. The collection efficiency was measured twice, and an average value was calculated. The results are shown in Table 3.

The honeycomb structure according to each of Comparative Examples and Examples obtained by the above producing procedure was subjected to air flowing under conditions of 25° C., 1 atm and 10 Nm³/min using a wind tunnel apparatus, and an initial pressure loss between the first bottom surface and the second bottom surface at the time of the air flowing was measured. The results are shown in Table 3.

TABLE 3

|  | Collection Efficiency (%) | Initial Pressure Loss, kPa |
|---|---|---|
| Comparative Example 1 | 67% | 5.8 |
| Comparative Example 2 | 98% | 8.6 |
| Example 1 | 89% | 6.0 |
| Example 2 | 85% | 5.8 |

As can be seen from the results shown in Table 3, the collection efficiency of the honeycomb structure of each Example was significantly improved in spite of substantially no change in pressure loss, as compared with the honeycomb structure of Comparative Example 1. In Comparative Example 2, the collection efficiency was high, but the pressure loss was too high.

DESCRIPTION OF REFERENCE NUMERALS

100 filter
102 outer peripheral side wall
104 first bottom surface
106 second bottom surface
108 first cell
110 second cell
112 partition wall
300 honeycomb structure part
301 first bottom surface
302 first cell
303 second cell
304 second bottom
305 partition wall
306 particulate matter

What is claimed is:

1. A filter comprising a columnar honeycomb structure part, the columnar honeycomb structure part comprising:
   a plurality of first cells each extending from a first bottom surface to a second bottom surface of the columnar honeycomb structure part, the first bottom surface being opened and the second bottom surface being plugged for the plurality of first cells;
   a plurality of second cells each extending from the first bottom surface to the second bottom surface of the columnar honeycomb structure part, the first bottom surface being plugged and the second bottom surface being opened for the plurality of second cells; and
   porous cordierite partition walls that define the first cells and the second cells, the partition walls having an average pore depth of 1.5 µm or more and 3.5 µm or less as measured by a laser microscope, and a porosity of from 50 to 60% as measured by a mercury porosimeter.

2. The filter according to claim 1, wherein the partition walls have the average pore depth of 2.5 µm or more and 3.5 µm or less as measured by the laser microscope.

3. The filter according to claim 1, wherein the partition walls have a maximum pore depth of 40 µm or less as measured by a laser microscope.

4. The filter according to claim 1, wherein the partition walls have a maximum pore depth of 20 µm or more and 26 µm or less as measured by a laser microscope.

5. The filter according to claim 1, wherein the partition walls have an average equivalent circle pore diameter of 10.5 µm or less as measured by a laser microscope.

6. The filter according to claim 1, wherein the partition walls have an average equivalent circle pore diameter of 5 µm or more and 10 µm or less as measured by a laser microscope.

7. The filter according to claim 1, wherein the partition walls have an average pore diameter of 5 µm or more and 13 µm or less as measured by a mercury porosimeter.

8. The filter according to according to claim 1, wherein the partition walls have a thickness of 150 µm or more and 260 µm or less.

* * * * *